United States Patent [19]

Kashkashian, Jr.

[11] Patent Number: 4,700,055
[45] Date of Patent: Oct. 13, 1987

[54] MULTIPLE CREDIT CARD SYSTEM

[76] Inventor: Arsen Kashkashian, Jr., 55 Briarwood Dr., Holland, Pa. 18966

[21] Appl. No.: 787,722

[22] Filed: Oct. 15, 1985

[51] Int. Cl.[4] ............................................. G06F 15/30
[52] U.S. Cl. ...................................... 235/379; 235/380
[58] Field of Search ................................. 235/379, 380

[56] References Cited

U.S. PATENT DOCUMENTS

| | | |
|---|---|---|
| 3,624,357 | 11/1971 | Wright . |
| 3,872,438 | 3/1975 | Cuttill . |
| 3,941,977 | 3/1976 | Voss ................................... 235/379 |
| 3,943,335 | 3/1976 | Kinker ................................ 235/379 |
| 4,395,627 | 7/1983 | Barker . |
| 4,469,937 | 9/1984 | Stockburger . |
| 4,472,626 | 9/1984 | Frid . |
| 4,476,468 | 10/1984 | Goldman . |
| 4,484,067 | 11/1984 | Obrecht . |
| 4,485,300 | 11/1984 | Peirce . |
| 4,506,148 | 3/1985 | Berthold . |
| 4,529,870 | 7/1985 | Chaum . |
| 4,614,861 | 9/1986 | Pavlov ............................... 235/380 |

Primary Examiner—Harold I. Pitts
Attorney, Agent, or Firm—William H. Eilberg

[57] ABSTRACT

The present invention is a system which enables a user to carry one credit card instead of many. The information pertaining to each credit card account, such as the name of the account, the number of the account, and its expiration date, are encoded on the card, by magnetic means, with a semiconductor memory device, or using any other means of recording data. The owner's name is also encoded on the card, but the card does not bear any visually-perceptible indication of the name of the owner, or of the names of the credit card accounts represented on the card. The invention also includes a microprocessor-based system which accepts the card, determines whether the credit card account selected for use by the owner of the card is valid, and prints a credit card invoice. In an alternative embodiment, only the name and identification number of the owner are encoded on the card, the information for the various credit card accounts being stored in a remotely-located computer. The single card can thus be used in place of a large number of different credit cards.

19 Claims, 3 Drawing Figures

MULTIPLE CREDIT CARD SYSTEM

BACKGROUND OF THE INVENTION

The present invention, relates to the field of credit card systems, and, in particular, discloses a system wherein a large number of credit cards of different issuers can be replaced by a single card.

Credit cards have been popular for many years, and the prior art is filled with technological innovations which facilitate the use of such cards, and the verification of credit card transactions. One system for automating the use of credit cards is shown in U.S. Pat. No. 3,872,438. This patent discloses a vending machine which can be operated with a credit card, without the need for an attendant. The card has a plurality of discs having a high dielectric constant, the arrangement of the discs forming a code which identifies the owner of the card. If the user of the vending machine fails several times to give the correct identification information, indicating that the credit card may have been stolen, the machine will sound an alarm.

U.S. Pat. No. 4,529,870 discloses another system which can be used for credit card verification. The system includes a card which has microprocessor circuitry embedded within it. The circuitry generates a code which insures that only the true owner of the card can use it. The card is inserted into a terminal, which, when proper identification has been given, permits the user to perform various financial transactions.

U.S. Pat. No. 4,485,300 gives an example of a system using remotely-located computers, the system being designed to verify the validity of a credit card. The system is intended for validation of transactions with so-called "bank" credit cards (such as those known by the trademarks and/or service marks "Visa" and "MasterCard"). Each issuer, i.e. each bank originating the card, determines the degree to which transactions made with its cards are to be checked. The system coordinates the varying desires of the several issuers in determining which cards, and how many cards, are to be investigated in detail before a transaction will be approved.

U.S. Pat. No. 4,472,626 discloses another verification system for credit cards, employing a remotely-located computer. A local microprocessor communicates, via telephone lines, with the remote computer, to retrieve information as to the validity of the credit card.

U.S. Pat. No. 3,624,357 shows another credit card verification system, the system being programmed, when the credit card is found to be valid, to print a credit card slip which constitutes an unsigned negotiable instrument for the amount of the purchase. The signature of the cardholder on the slip turns the slip into a valid check.

There have also been many examples, in the prior art, of means for encoding information onto a credit card, or similar card. For example, U.S. Pat. No. 4,469,937 discloses a method of writing data onto a card by varying the optical properties of a band disposed on the card. The variations in this band constitute the encoded data. The system varies the degrees of contrast in various portions of the band, but these variations are not perceptible to the human eye.

In U.S. Pat. No. 4,476,468, a set of light-changing crystals, embedded in the card, modulates a light beam to reveal the information contained in the card. And in U.S. Pat. Nos. 4,484,067 and 4,506,148, integrated circuits are embedded within the card to provide means for identifying the owner of the card.

Another example of a credit card system is shown in U.S. Pat. No. 4,395,627. This patent shows a system which is designed primarily for credit card purchases from gasoline stations, and discloses a control console connected to a credit card reader and a printer for generating credit card invoices.

All of the above-cited patents are incorporated by reference into this disclosure.

While all of the patents described above provide useful techniques for encoding data onto credit cards, and for automating the credit card verification procedure, none deals with the problem addressed by the present invention. With the proliferation of credit cards that has occurred in recent years, even the relatively infrequent user of credit cards maintains a large number of credit card accounts. It is not uncommon for a customer to hold ten, twenty, or even more credit cards, including bank credit cards, gasoline cards, "travel" cards, and the like. It is very difficult, if not impossible, to fit such a large number of cards into a wallet. Moreover, the greater the number of cards, the greater the risk that some of them can be lost, stolen, or misplaced. And if some, but not all, are stolen, the loss of a few of the cards may not be detected immediately. Furthermore, the person who leaves several less frequently-used cards at home, to conserve wallet space, may suddenly find that the card which is now wanted is not available.

Virtually all the credit cards currently issued by credit card companies are also a security risk for the public. Credit cards almost always show the name of the issuer, and have the account number and the name of the cardholder embossed on the card. This information can be easily read and used by a thief. Although the cardholder's liability in most cases is generally limited, as a matter of law or custom, the fact remains that someone must bear the loss, directly or indirectly. That "someone" is invariably the consuming public.

The present invention solves the problems discussed above by replacing a plurality of credit cards with a single card. Instead of carrying ten, twenty, or more individual cards, the cardholder can use a single card, thereby saving space, and maximizing convenience.

SUMMARY OF THE INVENTION

In one embodiment, the present invention comprises a card having information concerning the cardholder's credit card accounts encoded thereon. The card is placed into a card reader which, under the control of a suitable console, and with the aid of a microprocessor, interprets the data on the card. The apparatus is connected to a printer which creates a credit card invoice.

The card does not contain any visible indication of the identity of the cardholder, or of the names of the credit card issuers. It is the responsibility of the merchant to ask the customer which credit card is to be used. The merchant enters the information given orally by the customer, and the microprocessor compares this information with the data on the card. If the information given does not match the stored data, the system is programmed to reject the transaction, and to emit a warning signal. If the information does match, the microprocessor may interrogate a conventional credit card verification system, such as is described in the above-cited patents, to determine whether the card is still valid, whether credit limits are exceeded, etc. If the credit card account is valid, the microprocessor directs the printing of a credit card invoice, and the transaction is completed.

In addition to having the customer give his or her name and possibly a personal identification number, the very fact that the customer knows what credit card accounts are represented on the card account, but that account is not found on the card, the customer is likely to have stolen the card. The merchant can then respond accordingly.

In another embodiment, the credit card does not itself contain information as to the individual credit card accounts of the cardholder. Instead, the card contains only identifying data pertaining to the cardholder. The microprocessor is connected, through a modem, to a remotely-located computer which stores a list of the credit card accounts held by each customer. The remote computer is thus interrogated by the merchant, through the console, and the computer accepts the transaction only if the credit card account named by the customer in fact exists for the card submitted. After it has been determined that the credit card account exists, the system can be programmed to perform a conventional verification procedure for the transaction. If the transaction is rejected for any reason, a warning is sounded; if it is accepted, a printer is activated to create an invoice.

Regardless of the embodiment used, the data can be encoded on the card in various ways. The data can be contained in an integrated circuit embedded in the card, or it can be written in magnetic form. It could also be encoded using the optical procedures described in the above-cited patents, or by other means. What is important is that the card identify the cardholder, and that such identification not be perceptible to the human eye.

It is therefore an object of the invention to provide a credit card system which replaces a plurality of credit cards with one card.

It is another object of the invention to improve the security of credit cards.

It is another object of the invention to reduce the space occupied by credit cards in the wallet of a credit card customer.

It is another object to provide a system as described above, wherein the card contains encoded information concerning a plurality of credit card accounts.

It is another object to provide a system wherein the card contains only identifying information about the cardholder, and wherein the data concerning the cardholder's accounts are stored in a remotely-located computer.

It is another object of the invention to provide systems as described above, wherein the identity of the cardholder, and the identities of the credit card accounts, are not perceptible from inspection of the card.

It is another object of the invention to provide systems as described above, wherein such systems can be used with conventional credit card verification devices.

Other objects and advantages of the invention will be apparent to those skilled in the art, from a reading of the following brief description of the drawings, the detailed description of the invention, and the appended claims.

DETAILED DESCRIPTION OF THE INVENTION

Figure 1:
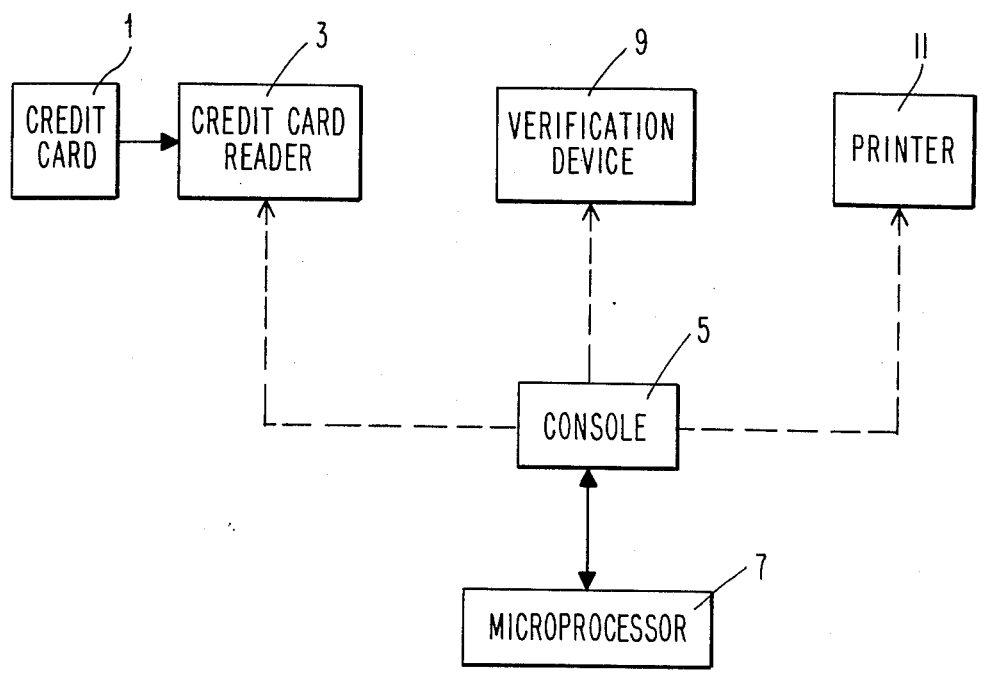
FIG. 1 is a block diagram of one embodiment of the present invention.

FIG. 1 is a block diagram which illustrates the principal components of the present invention. A credit card 1, onto which a set of data has been previously encoded, is inserted into card reader 3. The card reader is controlled by a console 5. The console has a keyboard for entry of data by a merchant. Consoles such as the ones shown in U.S. Pat. Nos. 3,624,357, 4,395,627, or 4,472,626, or similar consoles, can be used.

Console 5 also operates in conjunction with microprocessor 7, which interprets the data obtained from the card, and input from the console. The microprocessor may be housed within the console, though this construction is not necessary. The microprocessor can be designated as a "local" computer, because it is located at the point of sale, in contrast with a remote computer described below.

The console also is connected to a verification system 9. The verification system used can be any conventional system for determining the validity of a credit card. Examples of such systems are shown in U.S. Pat. Nos. 4,476,468, 3,872,438, 4,529,870, 4,485,300, 4,472,626, and 3,624,357. The apparatus also includes a printer 11, also operatively connected to the console, for creating a credit card invoice when a transaction is approved.

The verification system can include a telephone connection to a remote computer, the remote computer being maintained by a credit card issuer. But the verification system can assume many other forms, and can be automated to varying degrees. For example, a simple "verification system", still in common use, is the manual placing of a telephone call to a credit card issuer, and receipt of an oral authorization code. It is even possible for the verification to be performed by searching through a printed table of invalid card numbers. The function of verification device 9 can be performed by any of these arrangements. Or, the verification system could be completely automated, in which case the microprocessor 7, through a suitable modem (not shown in FIG. 1), would communicate with the remote computer of a credit card issuer, and would determine whether to approve the transaction.

Figure 2:
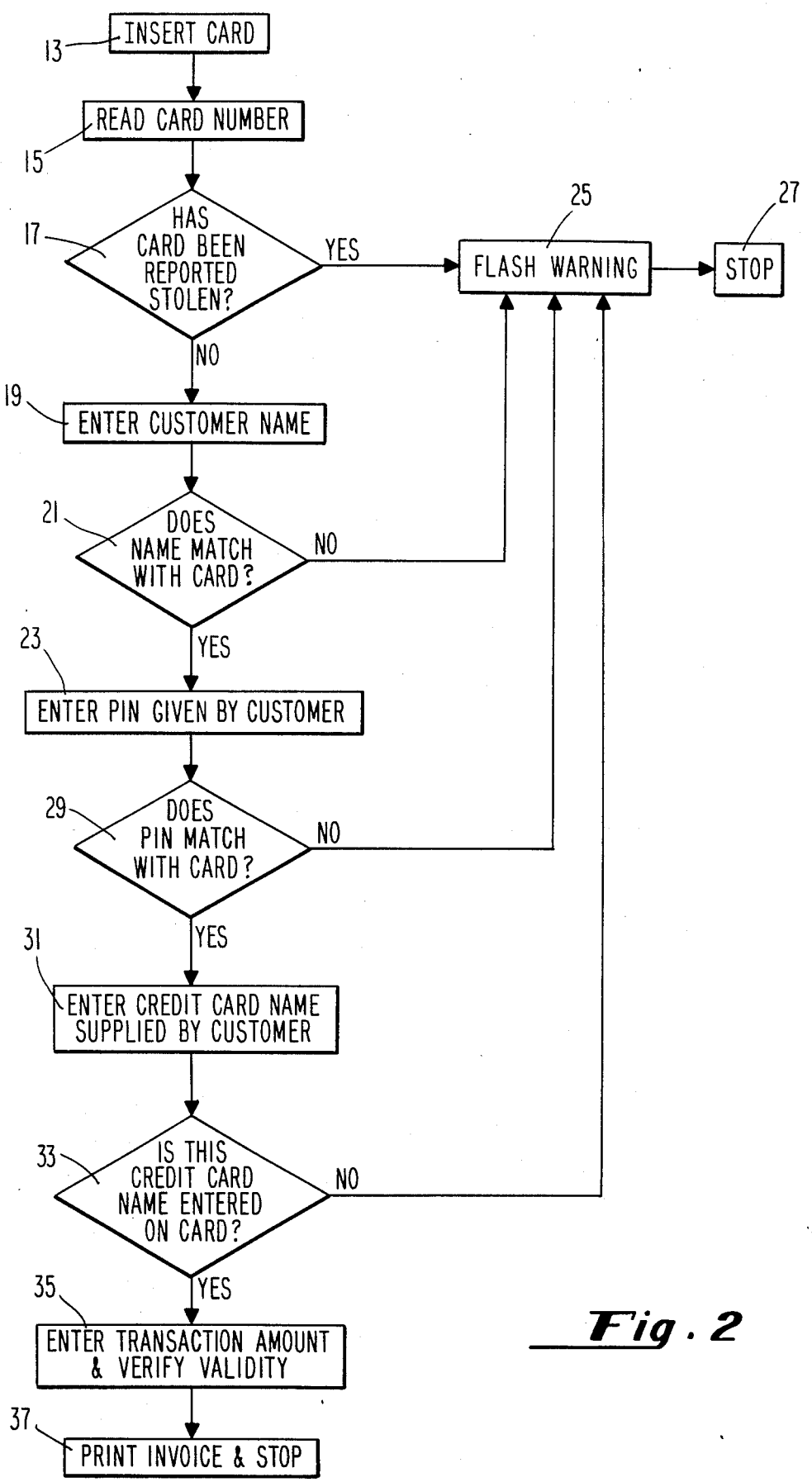
FIG. 2 is a flow diagram illustrating the logic of the microprocessor shown in FIG. 1.

An example of the logic of the programming of microprocessor 7 is given in the flow chart of FIG. 2. Before the program begins to run, the customer presents the credit card to the merchant. The merchant asks for the customer's name, and possibly for a personal identification number (PIN). The merchant also asks the customer for the name of the credit card. As used herein, the term credit card "name" means the name of the issuer, e.g. "VISA", "American Express", "Diners Club", etc., not the name of the cardholder. The card itself does not bear any of this information in visually perceptible form. If the customer does not give a correct cardholder name, a correct PIN, and a valid credit card account name, the merchant will know that the card is probably being improperly used.

When the customer gives the card to the merchant, the merchant first inserts the card into the reader, as indicated in block 13. The system reads the card number from the card, in block 15. This card number is a unique number assigned to every card issued according to the present invention. The microprocessor is programmed with a set of card numbers for cards which have been reported lost or stolen, this set being updated from time to time as the merchant receives bulletins concerning stolen cards. Preferably, the merchant is provided with a disk or tape, or even a replacement ROM chip, containing this information, which information can be quickly loaded into the microprocessor. In test 17, the system determines whether the card has in fact been reported lost or stolen. If so, the system transfers to block 25, issues a warning signal, and stops in block 27. The warning signal can be a flashing light, a tone, or a combination of these.

If the card is not lost or stolen, the system proceeds to block 19, where it prompts the merchant to enter the name of the customer. The merchant enters the name given orally by the customer, onto the console keyboard. The system then checks, in block 21, whether this name matches the name stored on the card. If it is not, the system branches to block 25, issues a warning signal, and stops in block 27. If the name is correct, the system prompts the merchant for the customer's PIN, in block 23. The system tests the validity of the PIN in test 29, issuing a warning and stopping if the PIN is incorrect. The invention can be practiced without the use of a PIN, in which case block 23 and test 29 would be omitted.

The system next prompts the merchant, in block 31, to enter the name of the credit card. The merchant enters the card name supplied by the customer. In test 33, the system compares the entered name with a list of credit card names encoded onto the card. If the credit card name supplied by the customer does not match one of the credit card names encoded on the card, the system transfers to block 25, issues a warning signal, and stops in block 27.

If the credit card name is valid, then the system continues in block 35. The merchant enters the amount of the transaction, and may then perform a verification step. The term "verification", as used herein, means the process of determining that the credit card account is valid, unexpired, and that the credit limit has not been exceeded. "Verification" is not to be confused with the steps of checking the identity and PIN of the customer, and of determining that the card is, in fact, encoded with a particular credit card name, as described above. The verification process can be done using existing, conventional verification devices. These devices can be connected for automatic actuation by the microprocessor, as described above. Thus, the microporcessor may automatically dial the telephone number of a remote computer, transmit the credit card information and the amount of the transaction, and wait for an authorization signal. Of course, the microprocessor must dial a different number, for each different credit card account, depending on which credit card is selected by the customer. The telephone numbers for each such credit card issuer are previously programmed into the microprocessor. The verification procedure can, of course, be semi-automatic or manual. It is also possible to omit the verification step entirely for some or all transactions.

If the transaction has been approved by a remote computer, the computer issues an authorization number, which is flashed on the console, and is automatically recorded by the system. If a manual verification system is used, the merchant enters an authorization code, or a code indicating that no authorization code is to be used.

The system, in block 37, then prints an invoice, which may include the authorization number. It is also possible, and within the scope of the invention, for the invoice to be written by hand. What is important is that a single card be used in place of plurality of credit cards.

It is also possible to program the card with data concerning the credit limits for each credit card account. In this case, it is not necessary to obtain this information from the verification system, although the verification system would still be needed to determine whether the card had expired, and to determine the outstanding account balance.

Figure 3:
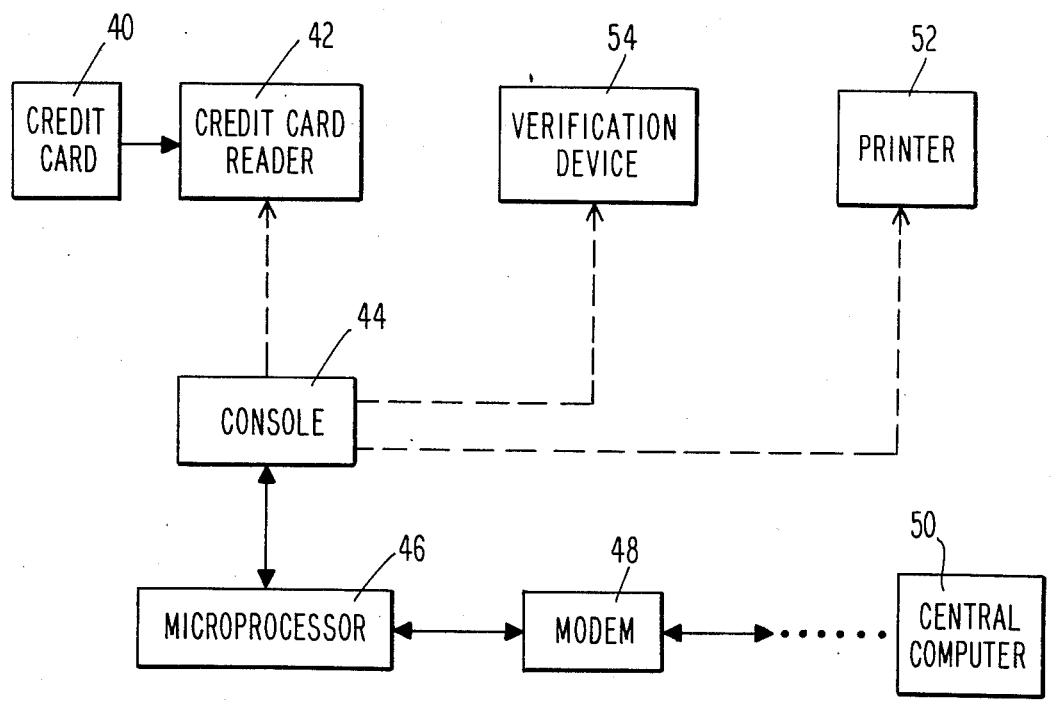
FIG. 3 is a block diagram of an alternative embodiment of the invention, wherein the credit card information is stored in a remotely-located computer.

FIG. 3 illustrates an alternative embodiment of the invention. In this embodiment, the credit card contains only an identifying card number, and, possibly, identifying data pertaining to the cardholder. It does not contain information on the credit cards held by the cardholder. Instead, the latter information is maintained in a remotely-located central computer.

In FIG. 3, credit card 40 is inserted into card reader 42. Console 44, similar to console 5 of FIG. 1, is used by the merchant to control the system. Microprocessor 46, which may also be built into the console, is connected to a modem 48, which provides communication, via telephone lines, with remotely-located computer 50. The system also includes a printer 52 for creating credit card invoices, and a verification device 54. Remote computer 50 stores information such as the name, number, expiration data, and credit limits for each credit card account maintained by the card owner.

The programming of microprocessor 46 is very similar to that of FIGS. 1 and 2, except that instead of reading information on credit card names from the card itself, the system derives this information from the remote computer. Remote computer 50 is not to be confused with the remote computers that may be part of verification device 54. The main function of computer 50 is to determine which credit card accounts are associated with a particular card. The computers which may be contacted by verification device 54 determine whether a particular credit card transaction should be approved. In general, computer 50 belongs to the system of the present invention, while the computers associated with the verification device belong to the respective credit card issuers.

Remote computer 50 can also store the name and PIN of the owner of the card. In this case, the only information that need be recorded on the card is the card number itself. The microprocessor can be programmed to interrogate the remote computer, so as to compare the information given by the customer with the information stored in the remote computer.

The embodiment of FIG. 3 has the advantage that credit card account information can be easily changed at one centralized location. Every time the customer adds a credit card, or changes an address, or changes a credit limit on a card, the change can be made without replacing or modifying the card. The embodiment of FIG. 1 has the advantage of speed of operation, since it is unnecessary for the merchant, or the microprocessor, to make a call to a central computer, in addition to any call required to a verification center.

The information encoded onto the card, whether it includes the name of the customer and the names of the credit card accounts, or whether it is limited to a single card number, can be stored in any conventional manner. Thus, the card may have an integrated circuit, or "micro-chip", implanted into the card, the circuit comprising a "read-only" memory (ROM) which stores the information. Of course, if a ROM is used in the first embodiment, a new card must be issued whenever a change is made in the cardholder's list of credit cards. The information on the card can also be encoded in other ways, such as with a magnetic strip, or by using the other techniques described in the patents cited above, or by still other methods. Whatever method of encoding is used, it is preferred that the data on the card not be visually perceptible.

The present invention facilitates the detection of stolen credit cards. When a customer reports a card as being lost or stolen, the card number is added to a list of lost or stolen card numbers. In the first embodiment of the invention, the microprocessors of all participating merchants are provided with updated information on stolen cards, so that the apparatus of every merchant will automatically reject all transactions attempted with that card. In the second embodiment, the list of stolen card numbers is stored in the central, remotely-located computer, and the system will also reject all attempted transactions automatically. In either case, placing a single card number on a list of stolen card numbers can prevent the use of all credit card accounts associated with the card. Because a plurality of credits cards are replaced by one card, it is very easy to prevent the card from being used again.

The embodiments of the invention, described above, are intended to be exemplary, and not limiting. Many variations are possible, within the scope of the invention. The particular types of microprocessor, card reader, console, and printer can be changed. Some of the steps performed automatically by the microprocessor could be performed manually by the merchant. As is clear from the above description, the type of information, and the level of detail of the information, contained on the card can also be varied to suit particular needs. The card may contain a great deal of information on the cardholder and his or her accounts, or it may contain no more than an identifying number, in which case the remaining information is stored in a central computer. These and other modifications are to be deemed within the spirit and scope of the following claims.

What is claimed is:

1. A system for representing a plurality of credit cards on a single card, comprising:
   (a) a credit card, capable of storing a set of machine-readable digital data, including identifying information pertaining to the owner of the card, and the names and numbers of a plurality of credit card accounts, the credit card accounts originating from a plurality of different issuers, the credit card being free of any visually-perceptible indicia pertaining to the owner of the card or to any of the credit card accounts encoded on the card,
   (b) a card reader, the reader being capable of decoding the data stored on the card,
   (c) a verification system for determining the validity of a proposed transaction with at least one of the credit card accounts stored on the card,
   (d) means for printing an invoice when a transaction has been approved, and
   (e) a console for controlling the card reader, the verification system, and the printer means, the console being connected to a microprocessor for analyzing the data on the card and for controlling the printing of the invoice.

2. The system of claim 1, wherein there is stored on the card an identifying code pertaining to the card owner.

3. The system of claim 2, wherein there are stored on the card the expiration dates of each credit card account listed thereon.

4. The system of claim 3, wherein there are stored on the card the credit limits associated with each credit card account listed thereon.

5. A credit card system, comprising:
   (a) a card capable of storing a set of machine-readable digital data, including identifying information pertaining to the owner of the card, the card including data pertaining to credit card accounts established by a plurality of different issuers, the accounts being established in the name of the owner of the card, the card being free of any visually-perceptible indicia pertaining to the owner of the card or to any of the credit card accounts encoded on the card,
   (b) a card reader,
   (c) a microprocessor,
   (d) a control console,
   (e) a printer,
   (f) a modem, and
   (g) a remotely-located computer, wherein the console is connected to control the card reader, the microprocessor, and the printer, wherein the modem is connected to provide data communication between the microprocessor and the remote computer, wherein the remote computer is programmed to store information on a plurality of credit card accounts maintained by the owner of the card, and wherein the remote computer is programmed to transmit a signal to the microprocessor, the signal indicating whether or not a transaction is approved.

6. The system of claim 5, wherein the information stored in the remote computer includes the name and number and expiration date of each credit card account maintained by the card owner.

7. The system of claim 6, wherein the information stored in the remote computer includes the credit limits of each credit card account maintained by the card owner.

8. A system for processing multiple credit card transactions, comprising:
   (a) card reader means for interpreting a set of machine-readable data encoded on a card, the card containing identifying information pertaining to the owner of the card, and the names and numbers of a plurality of credit card accounts, the credit card accounts originating from a plurality of different issuers, the card being free of any visually-perceptible indicia pertaining to the owner of the card or to any of the credit card accounts encoded on the card,
   (b) a local computer,
   (c) means for establishing a data communication path between the local computer and a remotely-located computer, and
   (d) a control console, the console being connected to control the card reader means and the local computer, the console including means for entering data for processing by the computer, the local computer being programmed to compare information on the identity of a customer, supplied by the customer and entered onto the console, with the data encoded on the card, the remote computer being programmed to compare the name of the credit card account, supplied by the customer and entered onto the console, with the data encoded onto the card, wherein the local computer is programmed to issue a warning if the information relating to the identify of the customer, given orally by the customer and entered onto the console, does not match the information encoded on the card, and to issue a warning if the name of the credit card account, given orally by the customer and entered onto the console, does not match the information stored in the remote computer, and to issue a signal of approval if all the information given orally by the customer, and entered onto the console, is correct.

9. The system of claim 8, further comprising means for printing an invoice, the printing means being connected for actuation by the local computer.

10. The system of claim 9, further comprising means for verifying the validity of the credit card account supplied by the customer.

11. A method for processing multiple credit card transactions, comprising the steps of:
(a) presenting a card containing identifying information pertaining to the owner of the card, and the names and numbers of a plurality of credit card accounts, the credit card accounts originating from a plurality of different issuers, the card being free of any visually-perceptible indicia pertaining to the owner of the card or to any of the credit card accounts encoded on the card,
(b) orally supplying identifying information pertaining to the owner of the card, and supplying the name of the credit card account to be used in a transaction,
(c) determining whether the identifying information and the credit card account name supplied match the information encoded in machine-readable form on the card, and
(d) processing the transaction for the credit card account selected if the information given matches the information encoded on the card.

12. The method of claim 11, wherein the processing step includes the step of verifying the validity of the particular credit card account selected.

13. The method of claim 12, wherein the processing step further comprises the step of printing an invoice for the credit card transaction.

14. The method of claim 13, further comprising the step of issuing a warning signal if any information contained on the card does not match the information supplied in step (b).

15. A method for processing multiple credit card transactions, comprising the steps of:

(a) presenting a card containing identifying information pertaining to the owner of the card, and containing the names and numbers of a plurality of credit card accounts, the credit card accounts originating from a plurality of different issuers, the card being free of any visually-perceptible indicia pertaining to the owner of the card or to any of the credit card accounts encoded on the card,
(b) orally supplying identifying information pertaining to the owner of the card, and supplying the name of the credit card account to be used in a transaction,
(c) determining whether the identifying information and the credit card account name supplied match the information encoded in machine-readable form on the card, and
(d) interrogating a remotely-located data base to determine whether the credit card account specified in step (b) in fact belongs to the owner of the card, and
(e) processing the transaction for the credit card account selected in step (b), if the identifying information given matches the information encoded on the card, and if the owner of the card is found to own a credit card account designated by the credit card name supplied.

16. The method of claim 15, wherein the processing step includes the step of verifying the validity of the particular credit card account selected in step (b).

17. The method of claim 16, wherein the processing step further comprises the step of printing an invoice for the credit card transaction.

18. The method of claim 17, further comprising the step of issuing a warning signal if any information contained on the card or in the remote data base does not match the information supplied in step (b).

19. A system for representing a plurality of credit cards on a single card, comprising:
(a) a card capable of storing a set of machine-readable digital data, including identifying information pertaining to the owner of the card, and the names and numbers of a plurality of credit card accounts, the credit card accounts originating from a plurality of different issuers,
(b) a card reader, the reader being capable of decoding the data stored on the card,
(c) a verification system for determining the validity of a proposed transaction with at least one of the credit card accounts stored on the card,
(d) means for printing an invoice when a transaction has been approved, and
(e) a console for controlling the card reader, the verification system, and the printer means, the console being connected to a microprocessor for analyzing the data on the card and for controlling the printing of the invoice.

* * * * *